(12) United States Patent
Spagnolini et al.

(10) Patent No.: US 11,929,782 B2
(45) Date of Patent: Mar. 12, 2024

(54) METHOD AND SYSTEM FOR POINTING ELECTROMAGNETIC SIGNALS EMITTED BY MOVING DEVICES

(71) Applicant: POLITECNICO DI MILANO, Milan (IT)

(72) Inventors: Umberto Spagnolini, Milan (IT); Monica Barbara Nicoli, Milan (IT); Mattia Brambilla, Milan (IT); Sergio Matteo Savaresi, Milan (IT); Giulio Panzani, Milan (IT)

(73) Assignee: POLITECNICO DI MILANO, Milan (IT)

( * ) Notice: Subject to any disclaimer, the term of this patent is extended or adjusted under 35 U.S.C. 154(b) by 227 days.

(21) Appl. No.: 17/440,965

(22) PCT Filed: Mar. 9, 2020

(86) PCT No.: PCT/IB2020/052018
§ 371 (c)(1),
(2) Date: Sep. 20, 2021

(87) PCT Pub. No.: WO2020/188400
PCT Pub. Date: Sep. 24, 2020

(65) Prior Publication Data
US 2022/0166510 A1    May 26, 2022

(30) Foreign Application Priority Data
Mar. 20, 2019 (IT) .......................... 102019000004009

(51) Int. Cl.
*H04B 10/112* (2013.01)
*H04W 4/02* (2018.01)
*H04W 4/46* (2018.01)

(52) U.S. Cl.
CPC ........ *H04B 10/1123* (2013.01); *H04W 4/026* (2013.01); *H04W 4/46* (2018.02)

(58) Field of Classification Search
CPC .............. H04B 10/1123; H04B 10/118; H04B 10/1129; H04B 10/112; H04B 10/1121;
(Continued)

(56) References Cited

U.S. PATENT DOCUMENTS 9,723,473 B2    8/2017  Shimizu et al.
10,080,146 B2   9/2018  Sundström et al.
(Continued)

OTHER PUBLICATIONS

International Search Report and Written Opinion dated Jul. 15, 2020 in corresponding International Application No. PCT/IB2020/052018; 11 pages.
(Continued)

*Primary Examiner* — Hibret A Woldekidan
(74) *Attorney, Agent, or Firm* — Maier & Maier, PLLC

(57) ABSTRACT

A method for transmitting electromagnetic signals by a vehicle moving towards a target device including a communication system provided with a radiating system that receives and transmits electromagnetic signals, performs an alignment step with the target device to establish a first communication direction with the target device, communicates with the target device by orienting the radiating system to receive and transmit data along the first communication direction, and performs a subsequent phase for maintaining the alignment with the target device to determine a future position and an orientation of the radiating system with a sensor being operatively connected to an electronic control unit of the vehicle configured to implement control and/or driving assistance functions of the vehicle based on information received from the sensor, and ultimately orientates the electromagnetic signals emitted by the radiating system on the basis of the determined direction of communication.

12 Claims, 9 Drawing Sheets

(58) Field of Classification Search
CPC . H04B 10/1125; H04B 10/1127; H04B 10/11; H04B 10/114; H04B 10/1141; H04B 10/1143; H04W 4/46; H04W 4/026; H04W 4/02; H04W 4/024; H04W 4/025; H04W 4/027; H04W 4/029
See application file for complete search history.

(56) References Cited

U.S. PATENT DOCUMENTS

| | | | |
|---|---|---|---|
| 11,198,439 B2* | 12/2021 | Mimura | H04W 4/46 |
| 2016/0118716 A1 | 4/2016 | Stephenne et al. | |
| 2018/0042066 A1* | 2/2018 | Kremo | G01S 13/86 |

OTHER PUBLICATIONS

Isamu Takai et al., "Optical Vehicle-to-Vehicle Communication System Using LED Transmitter and Camera Receiver", IEEE Photonics Journal, vol. 6, No. 5, Oct. 1, 2014; pp. 1-14.

* cited by examiner

METHOD AND SYSTEM FOR POINTING ELECTROMAGNETIC SIGNALS EMITTED BY MOVING DEVICES

TECHNICAL FIELD

The present invention to the field of telecommunications. In particular, the invention relates to a method and a system for the formation of beams of electromagnetic waves in mobile communication systems. In more detail, embodiments of the present invention relate to the exchange of electromagnetic signals through radiating systems in mutual movement.

BACKGROUND

Electromagnetic signals with millimetre wavelengths (mmWave) and lower such as, for example, radio signals with frequencies greater than 6 GHz that are at the basis of the telecommunication technology called '5G mmWave', and optical signals undergo rapid attenuation in the propagation direction. It is known that these signals are absorbed by the molecules that constitute the earth's atmosphere (in particular oxygen) and can be blocked by obstacles with a contained thickness and/or low density (e.g. fabrics, plastic sheets, living beings, etc.).

In order to compensate for the quick attenuation of these signals, it is common practice to use directive antennae with fixed directivity and high gain, preferably at both ends of the communication connection (i.e., link). In mobile systems, arrays of antennae are adopted to replace fixed directive antennae, so as to allow the dynamic correction of the pointing direction. The signals provided to the antennae of the array are appropriately processed so as to maximize the gain of the array, i.e. the spatial direction of the maximum power value, towards a preferred direction. This step of processing the antenna signals is known as beamforming and generally aims to maximize the transmission power of an array of antennae in the direction of another antenna or another array of antennae in order to allow effective communication between the two devices.

In the case of communications between mobile devices—such as, for example, vehicles, smart phones, robots, etc.—the position variation complicates the alignment between the array of antennae mounted on the related mobile devices, and can cause interruption of the communication. In order to guarantee the continuity of the communication it is known to periodically perform a realignment the two arrays of antennae. In general, the realignment is performed with a frequency proportional to the mutual speed between the mobile devices.

Some known solutions envisage an alignment step which is performed in each transmission time frame before the transmission of the data. During the alignment step, the two arrays of antennae exchange training (or probe) signals sent according to a certain number of directions and verify the attenuation thereof, so as to choose the one with lowest attenuation as the data transmission direction. The main limit of these solutions is that the alignment step reduces the amount of data that can be transmitted during each time frame and implies a non-negligible energy consumption for the transmission of the probe signals for alignment.

Such problem is exacerbated in the case of three or more devices communicating with one another. In fact, in this case, the duration of the alignment step necessary per pair of devices is extended and therefore the time frame portion available for the exchange of useful data between all the devices is reduced.

U.S. Pat. No. 9,723,473 discloses a communication method based on millimetre waves between a first and a second device. The method, implemented by the first device, envisages determining a future position of the second device and aligning a beam emitted by a first millimetre-wave communication unit of the first device to the future position of the second device.

However, the estimated position of the second device, based on the initial position and speed thereof, does not allow a sufficiently precise alignment to be obtained between the antenna of the first device and the antenna of the second device and, therefore, efficient communication between the devices is limited. Furthermore, the devices require a DSRC (Dedicated Short-Range Communications) module for performing communications with the second device or have to be provided with sensors able to perform measurements relative to the other device (e.g. they have to measure a distance and speed of a target device) in order to be able to perform the alignment of the radio signals. Additionally, the method does not contemplate mutual inclination corrections as in the case of vehicles subject to orientation variations.

US 2016/0118716, instead, proposes a method for aligning a beam that envisages determining the orientation of a transceiver and compensating the transmission angle thereof, in accordance with the orientation of the transceiver itself, through access to an inertial system. The method also envisages modifying the beamforming operation on the basis of the orientation of the transceiver device.

As efficient as it may be, the solution described in US 2016/0118716 is expensive, as it requires the use of dedicated sensors able to determine the position and orientation of the transceiver. Furthermore, such solution does not solve the problem of the time necessary for the formation of the beam. In fact, in US 2016/0118716, the step of forming the beam not only requires the sending of multiple probe signals for determining the transmission direction with the lowest attenuation, but also envisages a further step of modifying the formation of the beam in order to keep in consideration the rotation of the transceiver device.

In U.S. Pat. No. 10,080,146 a sensor in a wireless communication device provides data such as the position, movement and rotation of the device. Using the sensor data it is possible to calculate the spatial data of the device and use such data for controlling the antenna beams for transmission and reception in the wireless communication system.

However, even the solution described in U.S. Pat. No. 10,080,146 has precision limits, as the antenna weights to be applied in the formation of the beam are calculated based on the estimate of the direction connecting the future position of the mobile communication device with the position of a network node. However, the communication device—which may be a telephone or a PC—has real and inertial dimensions in movement. Furthermore, the lack of a kinematic reference prevents the possibility of exactly reconstructing the motion action of the device (e.g. think of an accelerometer that translates at uniform speed—it is impossible to determine the effective displacement of the device from its measurements), even if it is integral with a system, reaching errors that cannot be ignored in a communication system with millimetre waves. Therefore, the estimated direction may not coincide with the direction that connects the antenna of the mobile communication device with the network node.

Finally, US 2018/042066 discloses an apparatus for wireless communications which comprises a radar, a communication device configured for using at least a portion of the frequency band used by the radar, and an acquisition device configured to acquire the position of a target by using the radar. Furthermore, the apparatus comprises a controller configured for determining a start time of a communication with the target based on a communication range of the communication device and the target trajectory. The controller manages the communication device in such a way that data are transmitted to the target at the communication time.

The solution proposed by US 2018/042066 is subjected to the same limitations and drawbacks already set forth with respect to the other known solution mentioned above.

SUMMARY

An object of the present invention is to overcome the disadvantages of the prior art.

In general, an object of the present invention is to present a method and related communication system that enable efficient communication between mobile devices—in particular vehicles—that are in relative movement to one another.

In particular, it is an object of the present invention to present a method and related system that enable efficient communication with electromagnetic waves with millimetre or shorter wavelengths.

In particular, it is an object of the present invention to present a method and related system that enable communication with millimetre or shorter waves that efficiently uses the available time frame for simultaneous transmission, guaranteeing good alignment of the beams transmitted by the radiating system (e.g. antennae or optical communication systems).

These and other objects of the present invention are achieved by a device incorporating the features of the accompanying claims, which form an integral part of the present description.

The present invention relates to a method for transmitting electromagnetic signals by a vehicle moving towards a target device. In particular, the moving vehicle is equipped with a communication system, provided with a radiating system through which it receives and transmits electromagnetic signals with millimetre wavelengths. Advantageously, the communication system:

performs an alignment step with the target device in order to establish a first communication direction with the target device, communicates with the target device by orienting the radiating system for receiving and transmitting data along said first communication direction, and performs a subsequent step of maintaining the alignment with the target device in which it determines, on the basis of data measured by at least one vehicle sensor, a future position and orientation of the radiating system, said sensor being operatively connected to an electronic control unit of the vehicle configured to implement driving control and/or driving assistance functions of the vehicle on the basis of information received from said sensor, it receives, preferably but not necessarily through the radiating system, information indicative of or adapted to predict a future position and orientation of a radiating system of the target device, it determines a second communication direction that connects the future position of the radiating system with the future position of the radiating system of the target device, and it orientates the electromagnetic signals emitted by the radiating system on the basis of the determined communication direction.

In one embodiment, the radiating system of the vehicle and the radiating system of the target device each comprise an antenna system, e.g. an array of millimetre-wave antennae. Additionally or alternatively, the radiating system of the vehicle and the radiating system of the target device each comprise an optical signal generator and an optical signal detector.

Thanks to such solution, it is possible to estimate in advance the position and orientation that will be assumed by both devices and therefore estimate positions and orientations that will be assumed by the antennae of each device, i.e. the source and target of the electromagnetic signals to transmit. In particular, it is possible to predict the position and orientation of the source and target antennae with precision thanks to the information received by one or more sensors from the first device and from the second device, therefore it is possible to orient the emission of the electromagnetic signals—i.e. perform the beamforming of the electromagnetic signals and/or orient the radiating system—so as to obtain optimal transmission. In particular, it is possible to obtain a wave front of the electromagnetic signals transmitted at the position of the radiating system associated with the second device and, thanks to the knowledge of the orientation of the radiating system, a maximum reception power can be guaranteed along the predetermined communication direction.

Access to the data provided by one or more sensors on board the vehicle—in unprocessed or processed form by the control unit—and, in particular, the exchange of information between the vehicle and the target device allows a prediction of the dynamics of both devices to be obtained and, therefore, particularly precise and accurate position and orientation of the radiating system of both.

The method can be considered as an open-loop orientation correction, which does not necessarily require a verification of the effective alignment of the radiating systems of the communication systems, thanks to the access to data provided by the sensors on board the vehicle.

In one embodiment, the vehicle communication system generates further information indicative of or adapted to predict a future position and orientation of the radiating system of the vehicle and transmits, preferably by means of the radiating system, said further information to the target device.

In one embodiment, the information comprises at least one from among parameters of a function of future dynamics of the radiating system of the target device; filtering coefficients indicative of the future dynamics of the radiating system of the target device, and one or more measurements detected by a sensor operatively connected to an electronic control unit of the target device configured to implement control functions and/or assistance for driving the vehicle on the basis of information received from said sensor and information on a position of said sensor and on a position of the radiating system in the target device.

Thanks to such solution, it is possible to predict the future position and orientation of the radiating system of the second device extremely precisely by means of contained quantity dynamics information, therefore, transferable with a short duration transmission and/or such as to allow a reduction of the power necessary for performing such transmission. Furthermore, this enables the same dynamic calculation algorithm to be used for predicting the position and orientation of both antennae.

In one embodiment, the communication system, in the alignment maintenance step, acquires at least one linear speed measurement and at least one angular speed measurement of the vehicle, and estimates at least one linear speed measurement and at least one angular speed measurement of the radiating system of the vehicle.

Preferably, in the alignment maintenance step, the communication system acquires one or more from among:
- at least one elongation measurement of shock absorbers of the vehicle;
- at least one steering angle measurement of the vehicle;
- at least one measurement of a torque transmitted by an engine of the vehicle;
- at least one measurement of the pressure applied to a vehicle braking apparatus, and
- at least one measurement of a distance between the vehicle and the target device, and combines one or more of said measurements with at least one linear acceleration measurement of the vehicle and/or at least one measurement of the angular speed of the vehicle for estimating at least one measurement of the linear speed of the radiating system of the vehicle.

The acquisition of such data provided by such sensors allows information to be acquired on the accurate and precise dynamics and therefore a prediction to be obtained of the position and orientation of the antennae through the particularly reliable dynamic calculation algorithm.

In one embodiment, the step of determining on the basis of data measured by at least one vehicle sensor, a future position and orientation of the radiating system envisages combining measured data with characteristic parameters of the vehicle, the characteristic parameters comprising at least one from among a mass, centre of gravity, weight of a transported load and geometric characteristics of the vehicle, and electromagnetic signal transmission parameters, the transmission parameters comprising at least one from a time interval duration, a pointing and opening angle of a beam of electromagnetic signals and a variability of an electromagnetic transmission channel.

In this way, it is possible to obtain an even more precise orientation and position prediction calculated by the communication system.

In one embodiment, the step of determining, on the basis of data measured by at least one vehicle sensor, a future position and orientation of the radiating system envisages estimating at least a linear speed of the radiating system of the vehicle according to the relationship $$\dot{P}_{CA}(t) = M \wedge \dot{\Omega}_{V1}(t) + \dot{P}_{V1}(t),$$

where M is a vector of spatial values indicative of a difference between relative positions and orientation between a centre of mass of the vehicle and a centre of mass of the radiating system, $\dot{\Omega}_{V1(t)}$ is a vector of the angular speeds of the vehicle, and $\dot{P}_{V1,2}(t)$ is a vector of the linear speeds of the vehicle.

In this way it is possible to define the position and orientation of the radiation system simply, quickly and effectively starting from data measured by the sensors referring to the vehicle and not to the radiating system.

In one embodiment, the step of maintaining the alignment with the target device is performed during a signalling time frame reiterated periodically in consecutive communication time periods.

Thanks to such solution, it is possible to guarantee high accuracy and precision of the orientation prediction and relative position for the entire communication time period, at the same time limiting the frequency with which the dynamic prediction must be updated and the necessary energy for performing it. Furthermore, the alignment time interval is substantially lower than the time necessary for performing an alignment according to the teachings of the prior art.

A different aspect of the present invention relates to a communication system provided with an orientable radiating system. The communication system comprises:
- a constraining means for the connection to a vehicle;
- a communication interface that can be connected to a communication line on which the data of at least one vehicle sensor are transmitted, such sensor being operatively connected to an electronic control unit of the vehicle configured to implement driving control and/or driving assistance functions of the vehicle on the basis of information received from said sensor, and
- an electronic unit operatively connected to said communication interface for receiving the data of said at least one sensor and configured to implement the above method.

A different aspect of the present invention relates to a vehicle comprising the communication system according to the preceding claim, wherein the vehicle comprises an electronic on-board system provided with at least one sensor configured to acquire inertial data associated with a movement of the vehicle, an electronic control unit and a communication channel configured to operatively connect the sensor to the electronic control unit. Advantageously, the communication system is operatively connected to at least one from among the communication channel and the electronic control unit for acquiring at least a part of the inertial data detected by the sensor.

Further features and advantages of the present invention will be more apparent from the description of the accompanying drawings.

BRIEF DESCRIPTION OF THE DRAWINGS

The invention will be described below with reference to some examples, provided for explanatory and non-limiting purposes, and illustrated in the accompanying drawings. These drawings illustrate different aspects and embodiments of the present invention and, where appropriate, reference numerals illustrating similar structures, components, materials and/or elements in different figures are indicated by similar reference numbers.

DETAILED DESCRIPTION OF THE EMBODIMENTS

Figure 1:
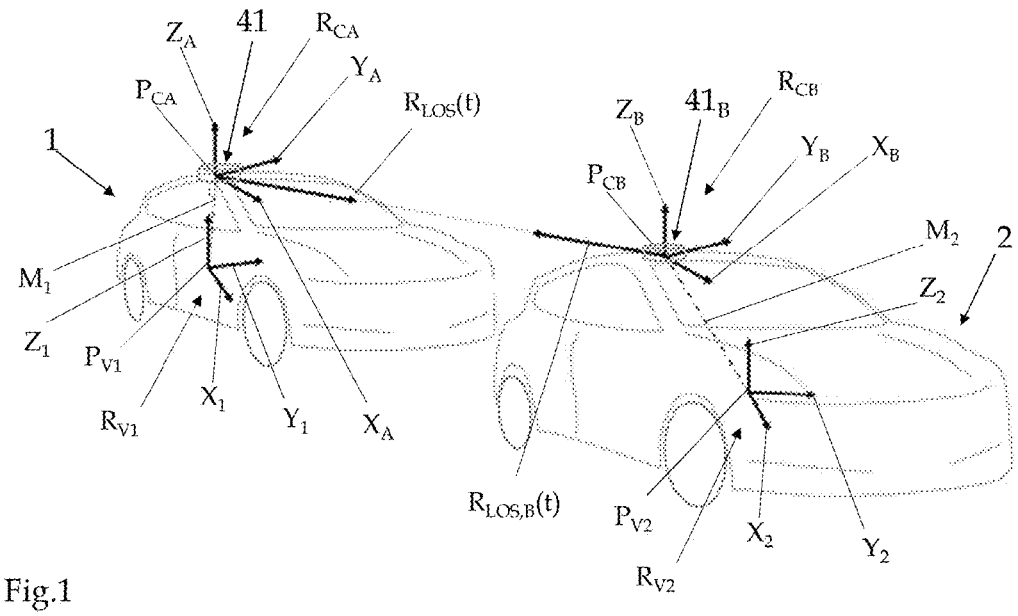
FIG. 1 illustrates a pair of vehicles adapted to communicate with one another according to an embodiment of the present invention.

While the invention is susceptible to various modifications and alternative constructions, certain preferred embodiments are shown in the drawings and are described hereinbelow in detail. It is in any case to be noted that there is no intention to limit the invention to the specific embodiment illustrated, rather on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" means "includes, but not limited to" unless otherwise stated.

With reference to the figures, a setting is considered in which a communication is established by means of electromagnetic signals, e.g. radio or optical signals, between two vehicles 1 and 2 (or V2V communication, or vehicle-to-vehicle).

In the example considered below, the vehicles 1 and 2 are two four-wheel road vehicles, however the vehicles could be of another type, e.g. with one, two, three or more wheels. In a non-limiting way, it is considered that the vehicle 1 comprises an on-board electronic system 30 and is also provided with a communication system 40. Such structure is replicated in the vehicle 2.

Figure 2:
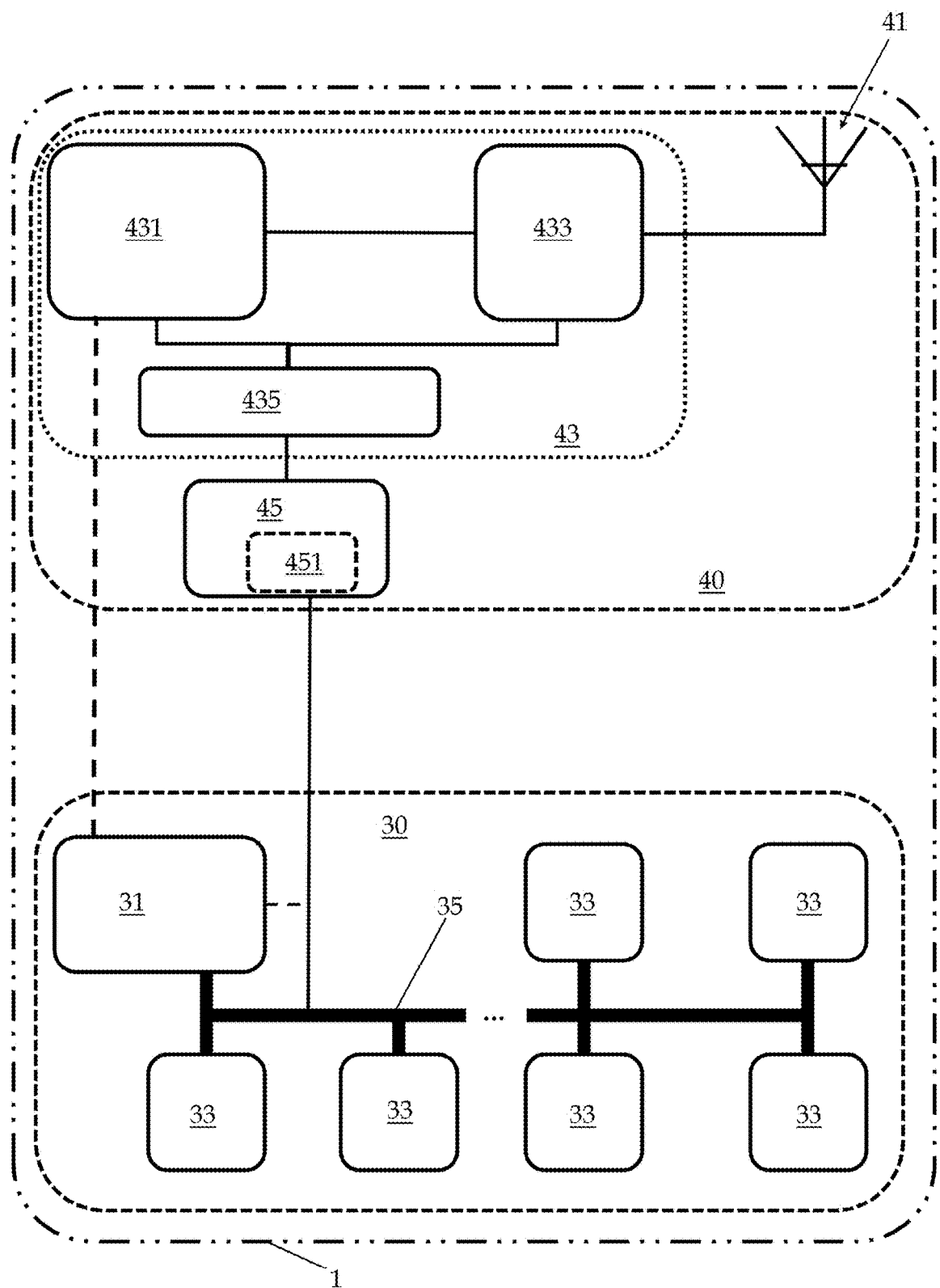
FIG. 2 illustrates a block diagram of some components of the vehicles of FIG. 1.

The on-board electronic system 30, illustrated in FIG. 2, is configured to optimize the operation of the engine and the monitoring of a plurality of operating parameters of the vehicle.

For that purpose, the on-board electronic system 30 comprises an electronic control unit, or ECU (Engine Control Unit) 31, one or more sensors 33, one or more user interfaces (not illustrated, e.g. an on-board computer and/or an 'infotainment' unit), possibly further sub-systems and/or processing units (not illustrated, e.g. an ABS, ESC, processing unit etc.) and, finally, ancillary components—not illustrated—e.g. circuitry for the power supply of the components.

The components of the on-board electronic system 30 are operatively connected to one another by means of a connection channel, preferably a communication BUS 35 (Binary Unit System), for example, of the FlexRay, CAN (Controller Area Network) and/or LIN (Local Interconnect Network) type. The ECU 31 receives the data of the sensors by means of the aforesaid connection channel and uses them for implementing control functions of the vehicle.

In particular, the sensors 33 comprise one or more inertial sensors, e.g. one or more accelerometers—of the linear and/or angular type—and/or one or more gyroscopes, which provide corresponding measures or inertial data related to the movement of the vehicle 1 or 2 on which they are equipped. In one embodiment, each vehicle 1 and 2 comprises an inertial measurement unit or IMU comprising at least two accelerometers and a vertical gyroscope. More preferably, the IMU comprises three accelerometers and three gyroscopes. For example, the IMU is comprised in an electronic stability control sub-system or ESC, pertaining to the on-board electronic system 30.

Preferably, the sensors 33 comprise at least one elongation sensor of the suspensions and/or at least one vertical accelerometer associated with the chassis or body of the vehicle, at least one steering sensor and at least one brake pressure sensor.

In a preferred embodiment, the sensors 33 comprise one or more elements able to determine a position or distance from a geographic point or from a generic object (e.g. another vehicle) within the detection range of the sensor. For example, the sensors 33 can comprise one or more from among:

Satellite positioning sensor (GPS, GLONASS, Galileo, BDS, etc.);
Ultrasound sensor;
Radar;
Lidar, and
Photo camera/television camera.

Preferably, the sensors 33 of the on-board electronic system 30 also respectively comprise, in a non-exhaustive way, one or more from among:

Steering angle sensors,
Braking pressure sensor,
Injector sensor;
Fuel level sensor;
Rain sensor;
Collision sensor;
Temperature sensor;
Pneumatic pressure sensors;
Engine sensors (oil, coolant, etc.);

For example, one or more sensors 33 mentioned above are comprised in one or more on-board electronic system sub-systems 30, such as:

An Anti-lock Braking (ABS) sub-system;
A traction control (TC) sub-system, and
A suspension electronic control sub-system, Each of which in turn comprises a sub-group of dedicated sensors 33.

Now passing onto the considered communication system 40, it is adapted to exchange electromagnetic signals, in particular radio signals with a frequency greater than or equal to 6 GHz—in a non-limited way frequencies typical of radio signals comprise 28 GHz, 60 GHz, 90 GHz, 120 GHz, up to 300 GHz. Radio signals at such frequencies are characterized by high attenuation and, therefore, require the orientation of the beam of radio signals irradiated towards a target receiver in order to guarantee efficient communication. Each communication system 40 comprises a radiating system, an antenna 41 in the example considered, a transceiver module 43 and a beam tracking device BTD 45, interconnected.

Below in the present description, where necessary, the radiating system, i.e. the antenna, of the vehicle 2 will be indicated by reference $41_B$ so that it is distinct from the antenna 41 of the vehicle 1. Likewise, operating parameters associated with the antenna $41_B$ will be marked by the subscript B per for distinguishing them from the operating parameters associated with the antenna 41.

Figure 3:
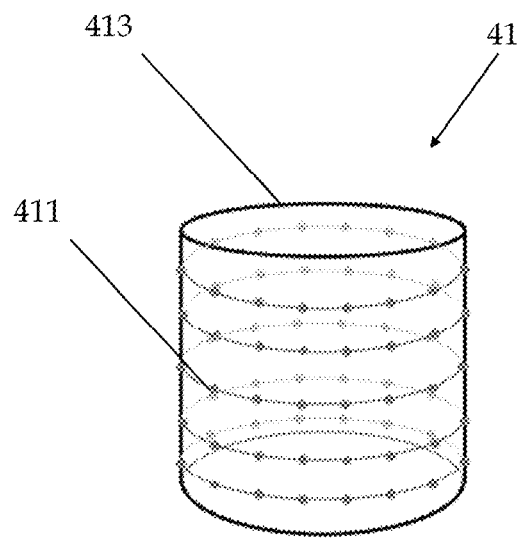
FIG. 3 schematically illustrates an antenna array used by the vehicles of FIG. 1.

In the embodiment considered, the antenna 41 is an antenna adapted to form a beam of radio signals emitted electronically—an operation commonly indicated with the term 'beamforming' (BF) in technical jargon. As one embodiment among many possible ones, the antenna 41 is a cylindrical array of antennae, i.e. comprising a plurality of antenna—e.g. patch or microstrip antennae 411—positioned on the lateral surface of a cylindrical support body 413 according to a radial arrangement along the extension thereof, as illustrated in FIG. 3. Preferably, the antenna 41 is arranged in a position that guarantees an extended visual field to guarantee improved transmission efficiency. In the example considered, the antenna 41 projects from the roof of the vehicle 1 or 2, transversally thereto, towards the environment external to the vehicle 1,2.

Each transceiver module 43 comprises a radio module 431 configured to codify and decodify radio signals, a beamforming module 433 configured to regulate the phase and amplitude of the signal emitted by each microstrip antenna 411—so as to control the orientation of the radio signals of the beam of radio signals emitted by the antenna—and a beamforming (BF) control module, below BF control module 435, configured to calculate the phase regulation and amplitude values then applied to the beamforming module 433, to which it is operatively connected, to the radio signals to transmit. Furthermore, the BF control module 435 is operatively connected to the BTD 45 and, possibly, the radio module 431 for exchanging data and/or warnings.

Otherwise, the radio module 431 is operatively connected to the beamforming module 433 for receiving signals to be decodified and transmitting codified signals and is connected to the on-board electronic system 30 of the vehicle 1,2 for exchanging data to be codified and transmitting the decodified data received.

Figure 4:
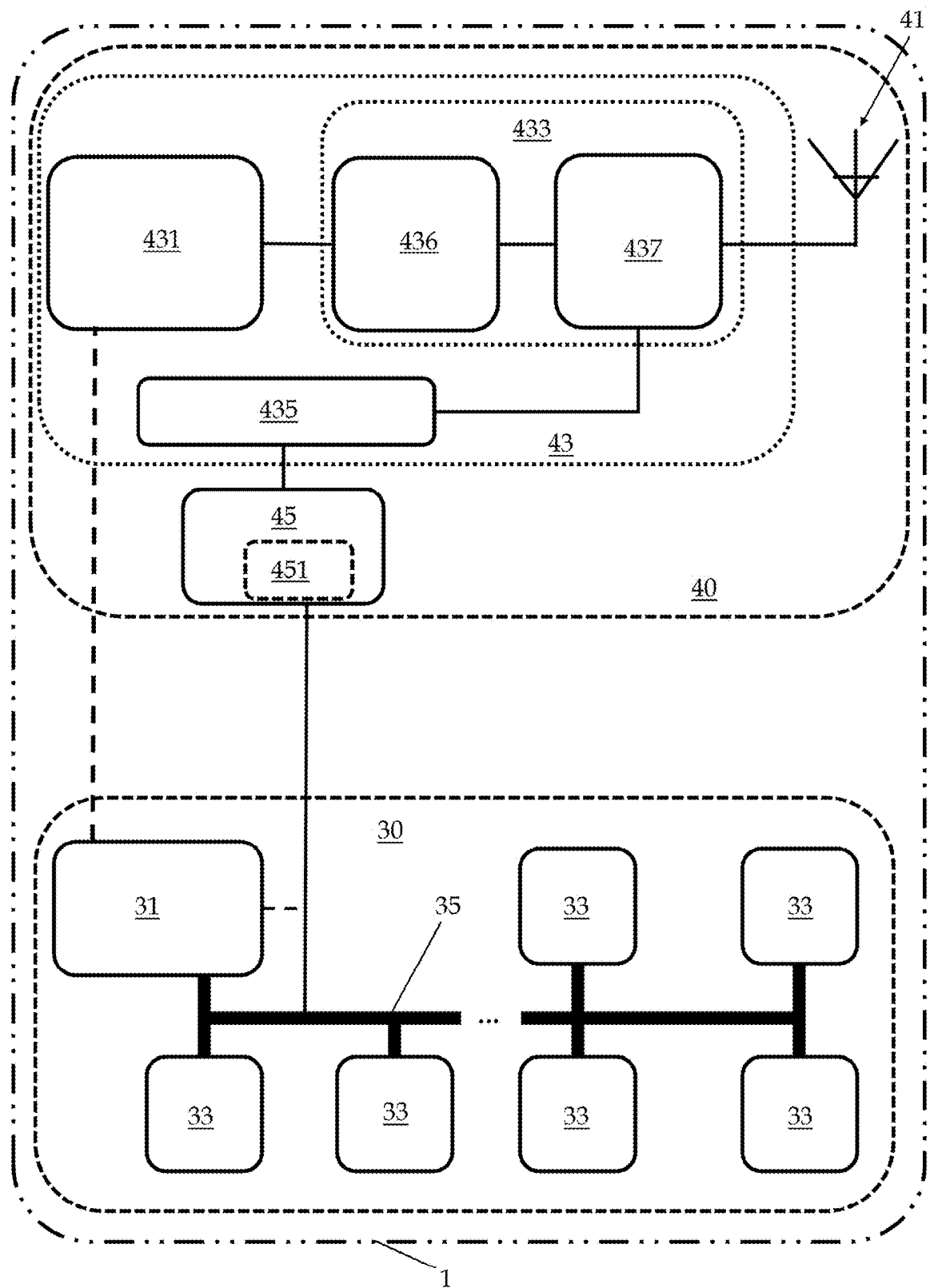
FIG. 4 illustrates a variant of the block diagram of FIG. 2.

In one embodiment of the present invention, illustrated in FIG. 4, the beamforming module 433 comprises two units connected in series to one another: a first beamforming unit 436 is controlled by the radio module 431 and is configured to calculate the beam alignment in the ways known in the state of the art. The beamforming module 433 also comprises a second (dynamic correction) unit 437, which is controlled by the BF control module 435 as described below. This structure represents the case in which the communication system 40 comprises a non-reconfigurable proprietary device comprising the radio module 431 and the first beamforming unit 436 configured to operate beamforming according to a way known in the state of the art.

The BTD 45 is operatively connected to the on-board electronic system 30. In one embodiment, the BTD 45 comprises an interface module 451 associated with the BUS 35 of the on-board electronic system 30. For example, the interface module 451 is configured to operatively connect the BTD 45 to the BUS 35 and, therefore, the BTD 45 can exchange data with other elements connected to the BUS 35 according to the communication protocol implemented. Alternatively, the interface module 451 can be configured to perform a "sniffing" of the data transiting on the BUS 35; in other words, the interface module 451 is configured to acquire data/information from the BUS 35 but remaining isolated therefrom. Also alternatively, the interface module 451 can be configured to operatively connect the BTD 45 directly with the ECU 31 and/or with another processing unit comprised in the on-board electronic system 30. Preferably, the BTD 45 comprises, in a non-limiting way, a processing unit—not illustrated, e.g. a processor, a microprocessor, a DSP an ASIC, a FPGA—and a memory unit—volatile and/or static.

Again, the BUS 35 can envisage that the signals provided by the sensors 33 are transmitted in synchronous form (i.e. the measurement signals are acquired in the same time instant) or asynchronous (the measurement signals are not acquired in the same time instant and therefore are not simultaneous). The interface module 451 envisages acquiring the signal generated by each of the sensors 33 at the time of reading (i.e. when each sensor 33 performs a respective measurement). Preferably, the BTD 45 envisages performing preliminary filtering necessary for temporarily aligning the signals provided by each sensor 33, e.g. by means of interpolations. Alternatively, the time re-alignment is performed by the ECU 31 and the BTD 45 accesses the data performed by the sensors 33 which are already temporally correct (i.e. aligned or synchronised with one another).

Optionally, the communication system 40 comprises an additional sensor, operatively connected to the BTD 45. Such sensor—for example, an inertial type sensor, such as a gyroscope and/or accelerometer—is advantageously arranged at the antenna 41 for measuring and correcting the influence of the local vibrations with respect to the rigid body of the vehicle 1,2.

In the solution according to the embodiments of the present invention, each communication system 40 is configured to use at least part of the data provided by the sensors 33 so as to effectively and accurately determine the movements of the antennae 41 and $41_B$ in space, in particular, during the movement of the respective vehicle 1 and 2.

Additionally and as described in more detail below, the measurements performed by the sensors 33 are exploited by the communication system 40 comprised in the vehicle for predicting the position of the antenna 41 and controlling the beamforming thereof. In particular, the communication systems define a communication channel in line of sight between the two antennae 41 and $41_B$ that enables a particularly effective exchange of radio signals.

Prediction Procedure

A prediction procedure 600, in accordance with embodiments of the present invention, is implemented in order to predict the dynamics of the moving vehicle 1, i.e. it is possible to estimate a future position and orientation of the vehicle 1 and, therefore, of the respective communication system 40—in particular, a dynamic D and future position and orientation of the antenna 41. Naturally, the prediction procedure described below can also be implemented by the second vehicle 2 mutatis mutandis.

In the present description, the term "dynamics" is used to indicate the evolution of the movement of a body over time; in particular, the dynamics D of the antenna indicate a trend over time of the position and angular orientation in space of the antenna 41 of the communication system 40.

Figure 5:
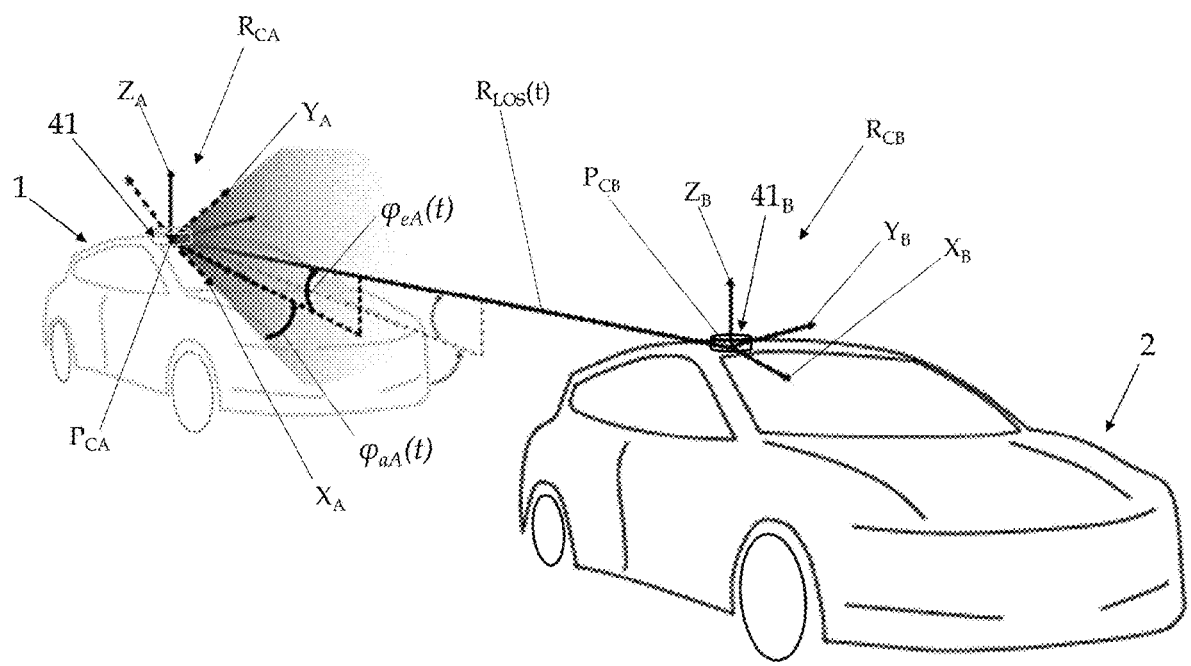
FIG. 5 illustrates the pair of vehicles of FIG. 1 during a communication step.

With reference to FIGS. 1 and 5, the behaviour of the vehicle 1 will be described by means of a Cartesian type reference system of the vehicle $R_{V1}$. Such reference system $R_{V1}$ is defined by a point of origin $P_{V1}$ and three angles, i.e. the yaw angle, the pitch angle and the roll angle, which are indicated as a whole through the vector $\Theta_{V1}$. Preferably, the point of origin $P_{V1}$ corresponds to the centre of mass, or centre of gravity, of the vehicle 1.

In the example considered, the vehicle 1 can be considered a rigid body able to move and rotate in a three-dimensional space defined by three axes passing through the respective point of origin $P_{V1}$: a longitudinal axis $X_1$, a transverse axis $Y_1$, and a vertical axis $Z_1$. In this hypothesis, the angle of rotation about the longitudinal axis $X_1$ is called the roll angle $\theta_{r1}$, the angle of rotation about the transverse axis $Y_1$ is called the pitch angle $\theta_{b1}$ and the angle of rotation about the vertical axis $Z_1$ is called the yaw angle $\theta_{i1}$.

Otherwise, to describe the movement of the antenna 41 of the vehicle 1, reference is made to an antenna reference system $R_{CA}$ also of the Cartesian type, and defined by a point of origin $P_{CA}$ and by three angles, i.e. the roll angle $\theta_{rA}$, the yaw angle $\theta_{iA}$ and the pitch angle $\theta_{bA}$, which are indicated as a whole through the vector $\Theta_{CA}$ below. Preferably, the point of origin $P_{CA}$ corresponds to the centre of mass, or centre of gravity, of the antenna 41.

Likewise, to describe the behaviour of the vehicle 2 reference is made to a Cartesian reference system of the vehicle $R_{V2}$ with origin in $P_{V2}$, whereas to describe the behaviour of the antenna $41_B$ reference will be made to a Cartesian reference system of the antenna $R_{cB}$ with origin in $P_{CB}$.

In the example considered, the antenna 41 is rigidly connected to the respective vehicle, therefore it is possible to define the following relations between points of origin and angles of the reference system $R_{V1}$ and $R_{CA}$:

$$\begin{cases} P_{CA} = P_{V1} + M \\ \Theta_{CA} = \Theta_{V1} + A \end{cases} \quad (1)$$

where M represents a vector that is preferably constant over time and A represents a vector of preferably constant angular values indicative of a difference between relative positions and orientation between the centres of mass of the vehicle 1 and of the antenna 41. Advantageously, the values comprised in the vectors M and A are stored in a memory unit (not illustrated) comprised in the BTD 45 or, alternatively, operatively connected thereto. The load variations in the vehicle, e.g. the passengers and their position, can move the references of the point of origin $P_{V1}$, the related corrections make the vectors M(t) and A(t) adaptable to the changed dynamic conditions of the vehicle.

Figure 6:
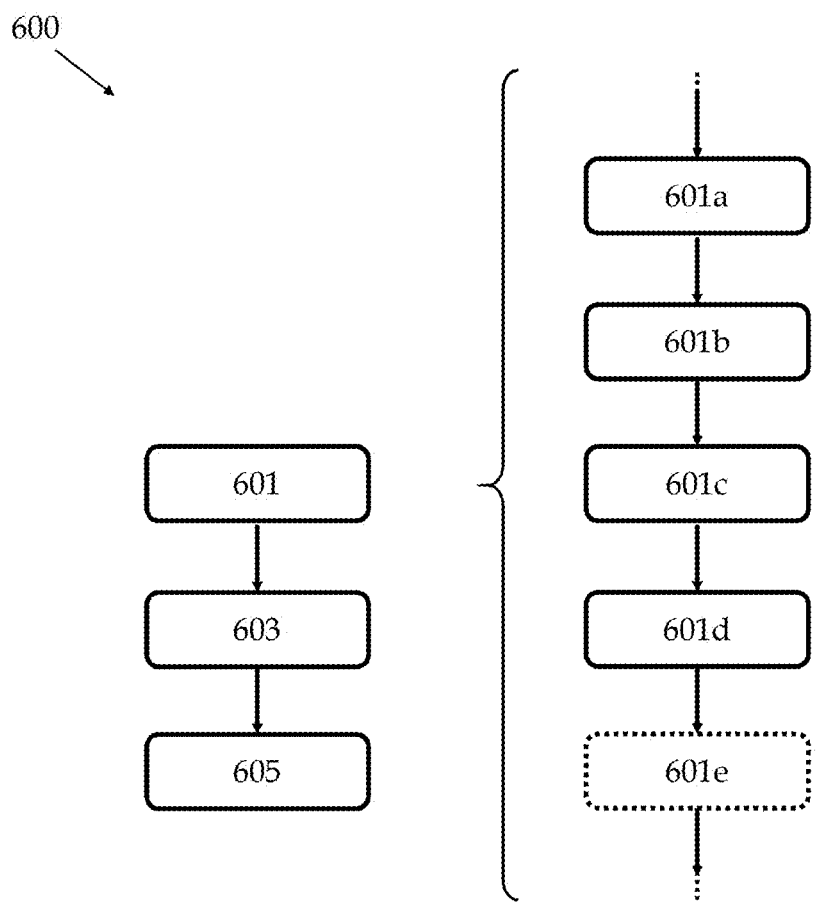
FIG. 6 illustrates a flow diagram of a procedure for predicting the dynamics of a vehicle according to an embodiment of the present invention.

In these hypotheses, the procedure initially envisages that at least a part of the measurements detected by the sensors 33 of the respective vehicle 1 are acquired (block 601 of the flow diagram of FIG. 6). In one embodiment, the BTD 45 of the communication system 40 is configured to acquire such data through the connection to the BUS 35 and/or to the ECU 31 of the on-board electronic system 30 of the vehicle 1.

In particular, the physical magnitude measurements detected by the sensors 33—possibly processed by the ECU 31 and/or by a further processing unit of the on-board electronic system 30—enable the linear speeds $\dot{P}_{V1}(t)$ and angular speeds $\dot{\Omega}_{V1}(t)$ of the vehicle 1 to be determined.

Preferably but not necessarily, the communication system 40, in particular the BTD 45, is configured to acquire measurements detected by the sensors 33 that enable a speed of the vehicle 1 to be determined along the direction of the longitudinal axis $X_1$, one or more angular speeds of the vehicle 1 and, preferably, linear accelerations of the vehicle 1, through which it is then possible to accurately determine the linear speeds and angular speeds of the vehicle 1.

Advantageously, the procedure 600 envisages acquiring (block 601a) the speed in the longitudinal direction of the vehicle 1—i.e. in the direction of the longitudinal axis $X_1$—directly by a speed sensor comprised between the sensors 33 of the on-board electronic system 30. For example, the longitudinal speed can be obtained directly by measurements detected by wheel speed sensors, speedometers and/or Pitot tubes equipped on the vehicle 1 in order to control the vehicle itself.

Likewise, the angular speeds $\dot{\Omega}_{V1}(t)$ of the vehicle 1 are preferably obtained (block 601b) by acquiring the measurements provided by the gyroscope comprised in the sensors 33. Alternatively, the angular speeds $\dot{\Omega}_{CA}(t)$ of the antenna 41 can be acquired by the gyroscope provided in the communication system 40, if present. In a third alternative, the angular roll and yaw speeds can be estimated indirectly by means of the measurements provided by the sensors 33 that measure the linear accelerations of the vehicle 1 along the transversal axis $Y_1$ and the vertical axis $Z_1$ and/or an elongation of the suspensions of the vehicle 1.

Otherwise, the on-board electronic system 30 of the vehicle 1, at least in the case of ground vehicles, does not comprise sensors 33 appointed to directly measure the speeds along the transverse direction and the vertical direction.

Therefore, the procedure 600 envisages acquiring (block 601c) acceleration measurements provided by elongation sensors of the suspensions and/or vertical accelerometers comprised between the sensors 33 and combining them so as to determine the vertical speed of the vehicle 1—i.e. in the direction of the vertical axis $Z_1$. Likewise, the procedure 600 envisages acquiring (block 601d) by acquiring and combining measurements—e.g. longitudinal and transverse acceleration, angular yaw speed and/or longitudinal speed—detected by the sensors 33 of the on-board electronic system 30—so as to determine the transverse speed of the vehicle 1—i.e. in the direction of the transverse axis $Y_1$.

Additionally, the procedure 600 can envisage the acquisition of further data provided by the sensors 33—if available—such as the steering angle, the braking pressure, and/or data processed by the ECU 31 such as the torque transmitted by the engine of the vehicle 1 to the drive wheels etc. These data, in combination with those already mentioned in the blocks 601c and 601d, enable a more accurate and precise estimate of the vertical and/or transverse speeds of the vehicle 1 to be obtained, regardless of the driving conditions thereof. In particular, the greater the number of measures provided by different sensors for calculating the actual speed or acceleration value, the greater the precision of the estimate value, but at the same time the longer the time and/or calculation power necessary for performing the estimate.

Therefore, in different embodiments, in order to calculate the dynamics D of the antenna 41 of the vehicle 1, a different amount of data can be used coming from different sets of sensors 33.

The procedure can also envisage using (optional block 601e) characteristic parameters of the vehicle 1—such as, for example, the mass of the vehicle 1 and/or its geometric characteristics—so as to further increase the precision and robustness of the estimates of the linear speeds $\dot{P}_{V1}(t)$, in particular of the linear speed along the transverse, and angular, direction $\dot{\Omega}_{V1}(t)$ of the vehicle 1 with respect to the driving conditions thereof as, for example, described in O. Galluppi, M. Corno and S. M. Savaresi: "Mixed-Kinematic Body Sideslip Angle Estimator For High Performance Cars" published in IEEE 2018 European Control Conference (ECC), Limassol, 2018, pp. 941-946. In this case, the parameters can be stored in a memory area (not illustrated) comprised in the BTD 45 or can be acquired by the ECU 31 and/or by another processing unit of the on-board electronic system 30.

For example, the BTD 35 can acquire the measurements taken by the sensor 33 whenever one of such data is transmitted by one of the sensors 33 or by one of the sub-systems, like the ESC subsystem, to the ECU 31 and/or to another processing unit of the vehicle 1; or more generally whenever one of such data is transmitted to the BUS 35. Advantageously, the BTD 45 also detects relative time information associated with each data, e.g. an instant in time for the acquisition of each datum. Alternatively, the measurements detected by the sensors 33 can be acquired periodically by the BTD 45, with a suitable time interval to allow an accurate prediction of the movement of the vehicle 1—e.g. the period of time depends on the detected speed of the vehicle 1 and/or data indicative of changes of direction such as steering, braking frequency, etc. Again, the measurements detected by the sensors 33 can be acquired by the BTD 45 asynchronously. Additionally, the prediction procedure 600 can only be implemented when an exchange of radio signals with another communication system is launched.

As will be clear to a person skilled in the art, the measurements provided by the sensors 33 refer to the reference system $R_{V1}$ associated with the centre of mass of the vehicle 1, which is different from the reference system $R_{CA}$ associated with the antenna 41—i.e. the source of the radio signals to be oriented. In other words, the Applicant has determined that the measurements provided by the sensors 33 must be processed in order to be referred to the antenna 41 rather than to the centre of mass of the vehicle 1 to allow efficient radio communication to be obtained.

Therefore, in the embodiments of the present invention an algorithm is implemented (block 603) to calculate the dynamics over time of the antenna 41 to predict the dynamics D of the antenna 41, i.e. of the point of origin PCA and of the angles contained in the vector $\Theta_{CA}$. In particular, the BTD $45_A$ is configured to predict the dynamics D of the antenna 41 within a future time interval [t0; t0+Δt]—where t0 indicates the instant of time in which the data provided by the sensors 33 are acquired and the maximum value of Δt depends on the calculation capacity of the BTD 45 and the pointing precision of the desired antenna 41. In this way, it is possible to obtain a future orientation variation and displacement prediction of the antenna 41, with respect to its reference system at the instant t0. Such prediction can be implemented with methodologies known by the name of dead reckoning.

In a first embodiment of such methodologies, the linear and angular $\dot{P}_{V1}(t)$ speeds $\dot{\Omega}_{V1}(t)$ of the vehicle 1, obtained as described above, are integrated to obtain the position and orientation variation of the vehicle 1 in the future time interval [t0; t0+Δt]. In the first place, the orientation variation is obtained by integrating the differential equation that describes the kinematic link between the orientation directions and the angular speeds:

$$\Delta\dot{\Theta}_{V1}(t) = R_\theta(\Delta\Theta_{V1}(t))\dot{\Omega}_{V1}(t) \quad (2a)$$

where $R_\theta(\Delta\Theta_{V1}(t))$ is an appropriate kinematic matrix. From the integration of such equation (2a) it is possible to obtain the orientation variation $\Delta\Theta_{V1}(t+\Delta t)$ of the reference system $R_{V1}$. In the second place, the movement of the reference system $R_{V1}$ is calculated by integrating the linear speed $\dot{P}_{V1}(t)$ appropriately re-projected by means of a kinematic matrix $R_p(\Delta\Theta_{V1}(t))$:

$$\Delta P_{V1}(t+\Delta t) = \int_t^{t+\Delta t} R_P(\Delta\Theta_{V1}(\tau))\dot{P}_{V1}(\tau)d\tau \quad (2b)$$

Thanks to the equations (1), it is possible to calculate, knowing the displacement $\Delta P_{V1}(t+\Delta t)$ and the orientation variation $\Delta\Theta_{V1}(t+\Delta t)$ previously obtained, the prediction of the displacement $\Delta P_{CA}(t)$ and the orientation variation $\Delta\Theta_{CA}(t)$ of the antenna 41 of the vehicle 1 in a generic instant t comprised in the future time interval [t0; t0+Δt].

In a second alternative embodiment, considering the approximation for which the vehicle 1 is a rigid body, the speed of the point of origin $P_{CA}$ and the angular speeds can be derived through the following relations:

$$\dot{P}_{CA}(t) = M \wedge \dot{\Omega}_{V1}(t) + \dot{P}_{V1}(t)$$

$$\dot{\Omega}_{CA}(t) = \dot{\Omega}_{V1}(t) + A \quad (3)$$

In other words, the linear speed $\dot{P}_{CA}(t)$ of the point of origin $P_{CA}$ of the antenna 41 comes from the sum of the linear speeds of the vehicle $\dot{P}_{V1}(t)$ and the contribution of the angular speeds $\dot{\Omega}_{V1}(t)$ of the vehicle 1—which refer to the point of origin $P_{V1}$ of the vehicle 1—translated into the point of origin $P_{CA}$ of the antenna 41 by multiplying the angular speeds $\dot{\Omega}_{V1}(t)$ with the vector M. By applying the equivalent equations (2a) and (2b), by the integration of the linear and angular speeds associated with the antenna 41 the variation in position $\Delta P_{CA}(t)$ and orientation $\Delta\Theta_{CA}(t)$ of the antenna 41 at a generic instant t comprised in the future time interval [t0; t0+Δt] are obtained.

In one embodiment, the dynamics D of the antenna 41 envisaged in the future time interval [t0; t0+Δt] is stored (block 605), at least temporarily. In particular, the prediction of the dynamics D of the antenna 41 can be stored as a parametric function as a function of the time and/or as a value or a series of position and orientation values of the antenna 41 calculated at successive instants of time $t_1, t_2, \ldots t_m$ (with $m \in N^+$) comprised in the future time interval [t0; t0+Δt].

At the end of the prediction procedure 600, the communication system 40, in particular the BTD 45 thus has available the prediction of the dynamics D of the antenna 41 in the future time interval [t0; t0+Δt], or likewise, the prediction of the future position and orientation of the antenna 41 in the future time interval [t0; t0+Δt].

In a different embodiment, the displacement $\Delta P_{CA}(t)$ and orientation variation $\Delta\Theta_{CA}(t)$ of the antenna 41 can be obtained by applying other dead reckoning techniques, as known to a person skilled in the art. However, access to the sensors, the parameters and the information of the vehicle is a unique and qualifying aspect of the claimed method for obtaining a prediction of the displacement $\Delta P_{CA}(t)$ and of the orientation variation $\Delta\Theta_{CA}(t)$ of the antenna 41 with suitable accuracy for the requirements of the control system for the implementation of autonomous navigation algorithms.

As will be clear, the procedure 600 described above can be implemented in the same way by the communication system $40_B$ of the vehicle 2 mutatis mutandis.

Pointing Procedure

Figure 7:
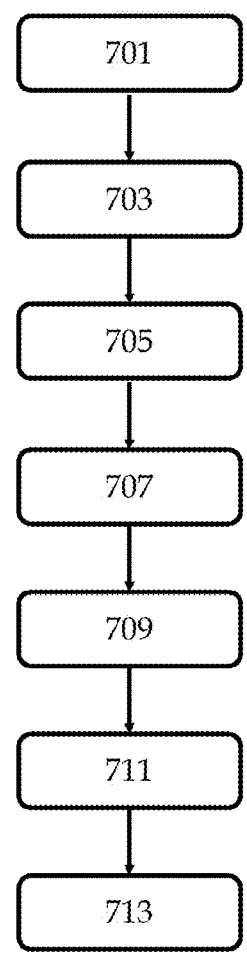
FIG. 7 illustrates a flow diagram of a procedure for the orientation and transmission of electromagnetic signals according to an embodiment of the present invention.
Figure 8:
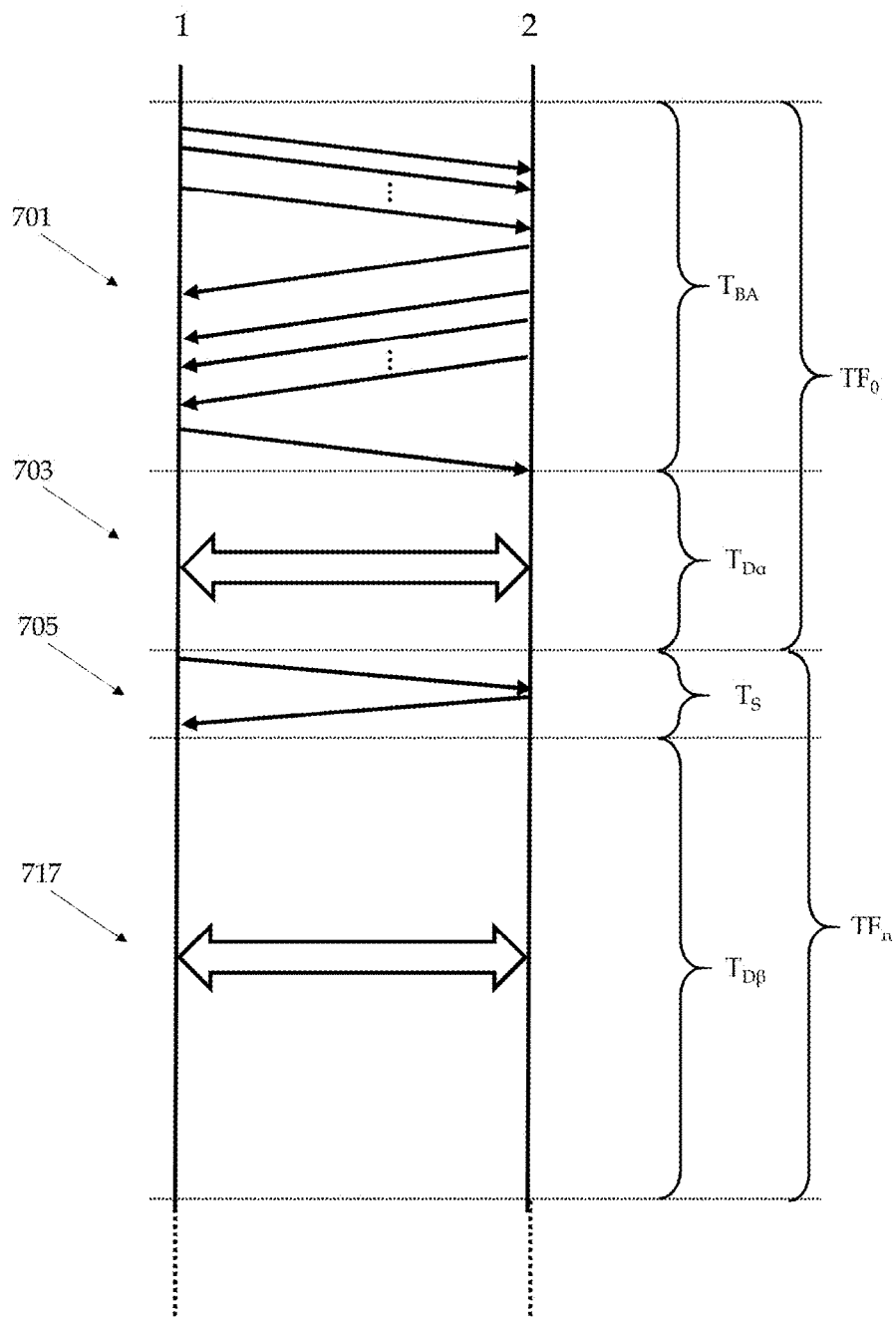
FIG. 8 illustrates an activity diagram related to a communication between the vehicles of FIG. 1 according to the procedure of FIG. 7.

With particular reference to FIGS. 7 and 8, a pointing procedure 700 of the antennae 41 and $41_B$ of the two moving vehicles 1 and 2 is now illustrated so as to establish and maintain a communication channel in line of sight, according to an embodiment of the present invention. Advantageously, the pointing procedure 700 is implemented by the communication systems 40 of the vehicles 1 and 2.

In an initial communication time period—or time frame—$TF_0$, a beam alignment step (block 701), or BA is performed, in the same way as what happens in the prior art. For example, when one of the communication systems 40 detects an emitted wave radio signal—possibly in an anisotropic way in space—of the antenna of the other vehicle, the communication system launches an alignment step in which, in a known way, the two communication systems of the two vehicles exchange a series of probe beams with different transmission directions and determine the transmission direction that experiences the lowest attenuation.

Once the alignment step has been completed, the radio signals emitted by the antennae 41 and 41$_B$ are oriented towards each other, so that for the remaining part TD$_\alpha$ of the time the communication systems initiate the true communication by exchanging data (block 703) through radio signals directed along the direction selected during the alignment step.

In the successive time frames TF$_n$ (n ∈ N$^+$) there is a signalling interval T$_S$ in which beamforming is performed based on the displacement and orientation prediction of the antennae 41 and 41$_B$ in the future time interval [t0; t0+Δt] for maintaining the communication channel in line of sight between them. Preferably, the duration Δt of the future time interval [t0; t0+Δt] corresponds to the, or alternatively comprises the, duration of a time frame TF$_n$, so that the position and orientation predictions of the antennae 41 and 41$_B$ allow the communication channel to be kept in line of sight between the antennae 41 and 41$_B$ for the entire duration of the time frame TF$_n$.

For example, in each time frame TF$_n$ the communication system 40 of each vehicle defines a respective communication direction of the line of sight R$_{LOS}$(t) (indicated with a thick black segment in FIG. 5), i.e. a semi-straight line aligned with the LOS that joins the two antennae 41 and 41$_B$ along which the radio signals exchanged between the antennae 41 and 41$_B$ are to be oriented.

In detail, the procedure envisages receiving (block 705) dynamics information I$_B$ related to the antenna 41$_B$ of the other vehicle 2—referring to the future time interval [t0; t0+Δt]. At the same time, dynamics information I related to the antenna 41 of the vehicle 1 is transmitted to the other vehicle 2.

The generic dynamics information I$_B$ transmitted from the vehicle 2 and received by the vehicle 1, can comprise, by way of example:

a. linear speed $\dot{P}_B(t)$ and angular speed $\dot{\Omega}_B(t)$ values of the antenna 41$_B$ processed by the corresponding BTD 45 at one or more successive time instants t$_1$, t$_2$, . . . t$_m$ (m ∈ N$^+$) comprised in the future time interval [t0; t0+Δt]—e.g. at least one linear speed $\dot{P}_B(t)$ and angular speed $\dot{\Omega}_B(t)$ value envisaged in the time frame TF$_n$, and b. dynamics data that allow the vehicle that receives them to estimate the position and orientation of the antenna of the vehicle that transmits them, in any future time interval comprised in the time interval [t0; t0+Δt]. For example, such dynamics data comprise parameters that allow the dynamics of the antenna to be defined during the future time interval [t0; t0+Δt], filtering coefficients that can be used to define the dynamics of the antenna, or one or more measurements detected by the sensors on-board the vehicle together with information on the positions of said sensors and of the antenna with respect to the geometry of the vehicle.

The dynamics information I related to the antenna 41 of the vehicle 1 transmitted to the other vehicle comprises analogous information to that just disclosed for the dynamics information I$_B$.

The prediction procedure 600 is implemented (block 707) to determine the dynamics D of the antenna 41—or, in other words, with the position and orientation predictions of the antenna 41 in the future time interval [t0; t0+Δt]—in particular, in the time frame TF$_n$ in progress. Advantageously, the procedure 600 can be implemented in parallel to the reception and transmission of dynamics information.

Subsequently, the dynamics information I$_B$ received is combined (block 709) with the dynamics prediction D of the antenna 41 obtained through the prediction procedure 600—or, in other words, with the future position and orientation predictions of the antenna 41—so as to determine optimal pointing of the antenna 41 towards the antenna 41$_B$ in the future time interval [t0; t0+Δt]—in particular, in the time frame TF$_n$ in progress. The result of this combination is the communication direction R$_{LOS}$(t) along which the radio signals emitted by the antenna 41 will be aligned—or, in other words, the communication direction R$_{LOS}$(t) is exploited to define the beamforming of the signals emitted by the antenna 41. In a preferred embodiment, the BTD 45 is configured to combine dynamics information IB received with the estimate of the dynamics D of the antenna 41.

Advantageously, the communication direction R$_{LOS}$(t) is defined with respect to the reference systems R$_{CA}$ of the corresponding antenna 41. In particular, the point of origin of the communication direction R$_{LOS}$(t) corresponds to the point of origin P$_{CA}$ of the antenna 41, while the orientation in space of the communication direction R$_{LOS}$(t) can be defined by an azimuth angle $\varphi_{aA}(t)$ and an elevation angle $\varphi_{eA}(t)$ depending on the angular positions of the antenna 41$_B$.

Therefore, in a generic time instant t comprised in the future time interval [t0; t0+Δt], the azimuth $\varphi_{aA}(t)$ and elevation angles $\varphi_{eA}(t)$ which define the communication direction R$_{LOS}$(t) can be described as a function of the displacements and orientation variations of the antennae 41 and 41$_B$, i.e.:

$$\phi_{LOS,A}(t) = f(\Delta P_{CA}(t), \Delta \Theta_{CA}(t), \Delta P_{CB}(t), \Delta \Theta_{CB}(t)) \quad (4)$$

where $_{LOS,A}(t)$ is a vector that comprises the azimuth angles $\varphi_{aA}(t)$ and elevation angles $\varphi_{eA}(t)$.

In particular, the BTD 45 can be configured to calculate the respective vector $_{LOS,A}(t)$ at at least one time instant comprised in the future time interval [t0; t0+Δt]—in particular, in the time frame TF$_n$ in progress:

a) by combining the linear speed $\dot{P}_A(t)$ and $\dot{P}_B(t)$ angular speed values $\dot{\Omega}_A(t)$ and $\dot{\Omega}_B(t)$ of both the antennae 41 and 41$_B$ processed by the corresponding BTD 45 at one or more same time instants t$_1$, t$_2$, . . . t$_m$—e.g., an initial, intermediate and/or final time instant of the time frame TF$_n$, or b) by combining the dynamics data contained in the dynamics information I$_B$ received with measurements detected by the sensors 33 of the on-board control system 30 or with the dynamics D of the respective antenna 41 at one or more of the same time instants t$_1$, t$_2$, . . . t$_m$—e.g., an initial, intermediate and/or final time instant of the time frame TF$_n$.

Advantageously, it is possible to select the number and the one or more future time instants t$_1$, t$_2$, . . . t$_m$ on the basis of one or more indicators among the reliability/quantity/noisiness of the data acquired by the sensors, the level of synchronicity of the acquisition system of the on-board sensors, the communication standard adopted for radio signals, etc.

In the preferred embodiment, the BTD 45 is also configured to consider the distance Dist(t) between the vehicles 1 and 2 in order to process the respective communication direction R$_{LOS}$(t), or the vector $_{LOS,A}(t)$. For example, the distance Dist(t) between vehicles 1 and 2 can be estimated by the BTD 45 of the vehicle which performs the calculation by means of data acquired by one or more on-board sensors 33 of the vehicle itself, such as a GNSS system, a radar, a lidar, an ultrasound sensor and of the other vehicle contained in the dynamics information $I_B$ received. Additionally or alternatively, the distance Dist(t) can be estimated by processing the information contained in images and/or video clips provided by other sensors 33 of the vehicle that performs the calculation such as, for example, photo cameras and television cameras. Also additionally or alternatively, the distance Dist(t) can be estimated from the communication system 40 alone of the vehicle that performs the calculation—therefore without the aid of sensors 33—determining the time of arrival (TOA) or time of flight (TOF) of the radio signals exchanged with the other vehicle.

The result of the processing—in particular, the vector $_{LOS_A}$(t)—is used (block 711) to point the antenna 41 along the communication direction $R_{LOS}$(t).

In particular, the BTD 45 is configured to provide, the vector $_{LOS_A}$(t) to the control module BF 435. Alternatively, the BTD 45 is configured to generate one or more pointing instructions on the basis of the vector $_{LOS_A}$(t) calculated and to provide such instructions to the respective control module BF 435. After receiving the vector $_{LOS_A}$(t) or the pointing instructions, the control module BF 435 generates correction instructions and transfers them to the beamforming module 433 which applies the correction to the signals codified by the radio module 431 which are then transmitted by the antenna 41.

In the event in which the transceiver module 43 has the configuration illustrated in FIG. 4, the vector $_{LOS_A}$(t) or the pointing instructions provided by the BTD 45 are re-processed by the control module BF 435 and transferred to the second beamforming unit 437 of the corresponding beamforming module 433 as corrections of a nominal beamforming $a_n$ generated by the first beamforming unit 436 described by the complex number of the baseband-equivalent model used commonly in the state of the art:

$$a_n = |a_n| e^{j\angle a_n}, \quad (5)$$

—i.e., the beamforming determined after the initial (beam-alignment) procedure—of each n-th microstrip antenna 311 comprised in the antenna 41.

The second beamforming unit 437 defines the correction of the beam pointing direction through a beamforming coefficient $bf_n$ for each generic n-th microstrip antenna 411 of the respective antenna 41. For example, the beamforming coefficient $bf_n$ can be described by means of a complex number:

$$bf_n = |bf_n| e^{j\angle bf_n}, \quad (6)$$

The second beamforming unit 437 modifies the nominal beamforming $a_n$ by means of a complex coefficient $b_n(t)$ that is variable over time, i.e.:

$$a'_n = |b_n(t)| e^{j\angle b_n(t)} |a_n| e^{j\angle a_n}. \quad (7)$$

As will be clear to a person skilled in the art, the embodiment just described with reference to FIG. 4 allows the optimized pointing of the beam of radio signals emitted by the antenna 41 to be implemented also in the event in which transceiver modules are used comprising proprietary electronic circuitry—or however that cannot be personalized—which integrates the radio module 431 and the first beamforming unit 436.

The antenna 41 is therefore pointed with precision towards the other antenna 41B and vice versa. Therefore, the communication systems 40 of the two vehicles 1 and 2, can exchange data (block 713) through radio signals for the part $TD_\beta$ of the remaining time frame $TF_n$.

Thanks to the pointing procedure 700 just described, the communication system 40 of each vehicle is able to emit a beam of radio signals oriented substantially towards the effective current position of the antenna 41 mounted on the other vehicle.

As can be understood by a person skilled in the art, the signalling window $T_S$ is substantially lower than the alignment time interval $T_{BA}$, as both communication systems 40 of the vehicles 1 and 2 perform a single transmission of the dynamics information I and $I_B$, after which they can perform an optimal orientation of the radio signals. Because of this, the part $TD_\beta$ of time frame dedicated to the transmission of data, during the successive time frames to the first, are substantially greater than the remaining part $TD_\alpha$ of time frame in the event in which a traditional alignment step is performed with the transmission of multiple probe signals.

Optionally, the method envisages repeating at least a further alignment step (BA) after a certain number of time frames in which the communication systems have maintained the alignment thanks to the exchange of dynamics information D and $D_B$ of the relative antenna 41 and $41_B$. Preferably, such further alignment step is repeated periodically after a number, comprised between 5 and 100 time frames, wherein the communication systems have maintained the alignment thanks to the exchange of dynamics information D and $D_B$ of the relative antenna 41 and $41_B$. More preferably, the frequency with which the alignment step is repeated is determined by the communication system 40 as a function of the accuracy of the estimate of the dynamics of the devices and/or a quality of the signals received—for example, evaluated in terms of the noise signal or SNR ratio. In this way it is possible to periodically reset contributions due to the accumulation of errors which, increasing with the passing of time, can reduce the precision of the beamforming.

Implementation Example

By way of example, some examples of the implementation of the method according to the embodiments of the present invention are illustrated below, based on the setting illustrated in FIGS. 4, 5, 9A-9C, and 10A-10B in which the first vehicle 1 follows the second vehicle 2. For simplification purposes, such example only considers the orientation variations $\Delta\Theta_{CA}(t)$ of the reference systems discussed. However, with an analogous procedure, it is possible to extend the analysis also including displacement variations $\Delta P_{CA}(t)$.

During the movement of the vehicles 1 and 2 the value of the roll angles $\theta_{r1}$ and $\theta_{r2}$, pitch angles $\theta_{b1}$ and $\theta_{b2}$ and yaw angles $\theta_{i1}$ and 74 $_{i2}$, varies over time due to various factors such as the path followed, the conditions of the ground and the various strain and the movement itself of each vehicle 1 and 2.

Considering the vehicle 1, the variation of the pitch angle $\Delta\theta_{b1}$ of the vehicle 1 in a generic instant t can be approximated by the relationship:

$$\Delta\theta_{b1}(t) = \tan^{-1}\left(\frac{h_1(t) - \bar{h}_1}{0{,}5\ell_{L1}}\right), \quad (8)$$

where $\bar{h}_1$ indicates the height (with respect to the ground S) of the point of origin $P_{V1}$ with respect to a horizontal plane S measured along the vertical axis $Z_1$ considered in the reference condition of the vehicle 1 (e.g. an initial position or a position at a previous measurement instant of the vehicle 1), $h_1(t)$ indicates the height with respect to the horizontal plane S of a longitudinal end portion (the 'nose' of the vehicle in the example in FIG. 9A) of the vehicle 1, along the longitudinal axis $X_1$ during a rotation about the transverse axis $Y_1$—i.e., a pitch of the vehicle 1—at the time instant t corresponding vehicle 1, and $\ell_{L1}$ indicates the longitudinal extension (i.e., along the axis $X_1$) of the vehicle 1.

In a similar way, the variation of the yaw angle $\Delta\theta_{i1}$ of the vehicle 1 at the instant t can be approximate by the relationship:

$$\Delta\theta_{i1}(t) = \tan^{-1}\left(\frac{j_1(t) - \bar{j}_1}{0.5\ell_{L1}}\right), \quad (9)$$

where $\bar{j}_1$ indicates a distance between the point of origin $P_{V1}$ and a transverse end portion of the vehicle 1 (a 'flank' of the vehicle in the example of FIG. 9B) measured along the transverse axis $Y_1$ in a reference condition (e.g. an initial position or a position at a previous measurement instant of the vehicle 1), $j_1(t)$ corresponds to the distance measured between the transverse end portion of the vehicle 1 in the reference condition and the position of the longitudinal end portion at the transverse axis $Y_1$, modified by a rotation of the vehicle 1 about the vertical axis $Z_1$—i.e., a yaw of the vehicle 1—, detected in the time instant t, and $\ell_{L1}$ indicates the longitudinal extension (i.e., along the axis $X_1$) of the vehicle 1.

Figure 9A:
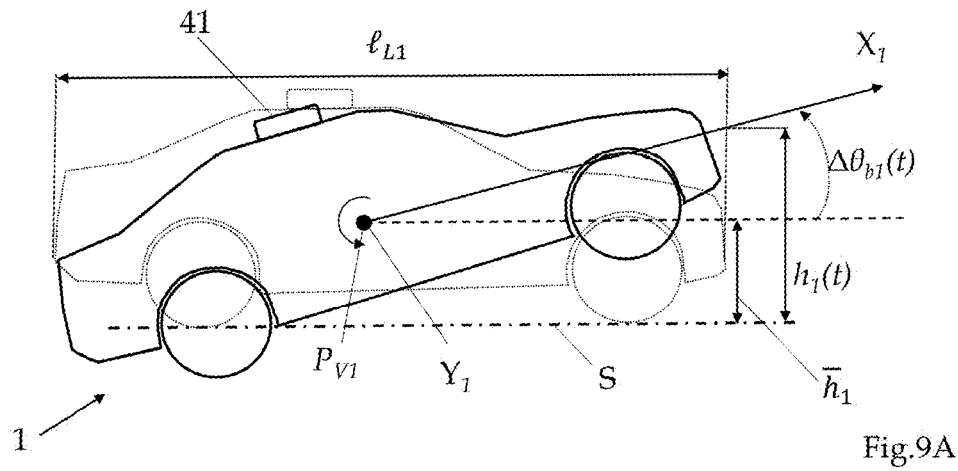
FIG. 9A illustrates a side of a vehicle in two different time positions during a pitching movement of the vehicle itself.
Figure 9B:
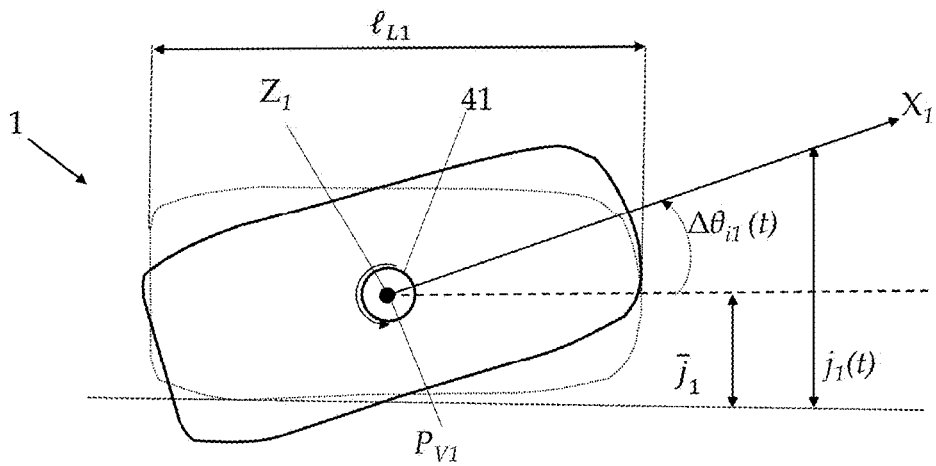
FIG. 9B illustrates a view from above of a vehicle in two different time positions during a yaw movement of the vehicle itself.
Figure 9C:
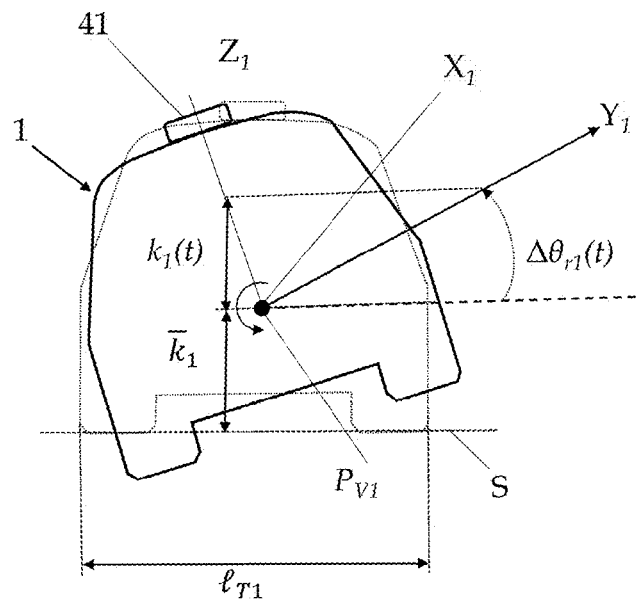
FIG. 9C illustrates a front view of a vehicle in two different time positions during a rolling movement of the vehicle itself.
Figure 10A:
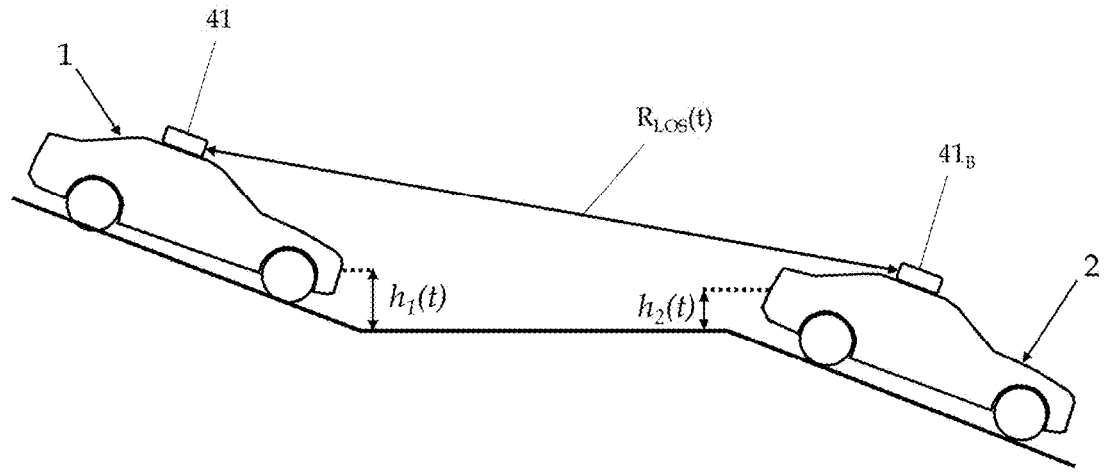
FIG. 10A illustrates a lateral view of a two-dimensional setting in which two vehicles travel on a non-rectilinear path, and FIG. 10B schematically illustrates orientation variations due to the pitching of the vehicles of FIG. 10A.
Figure 10B:
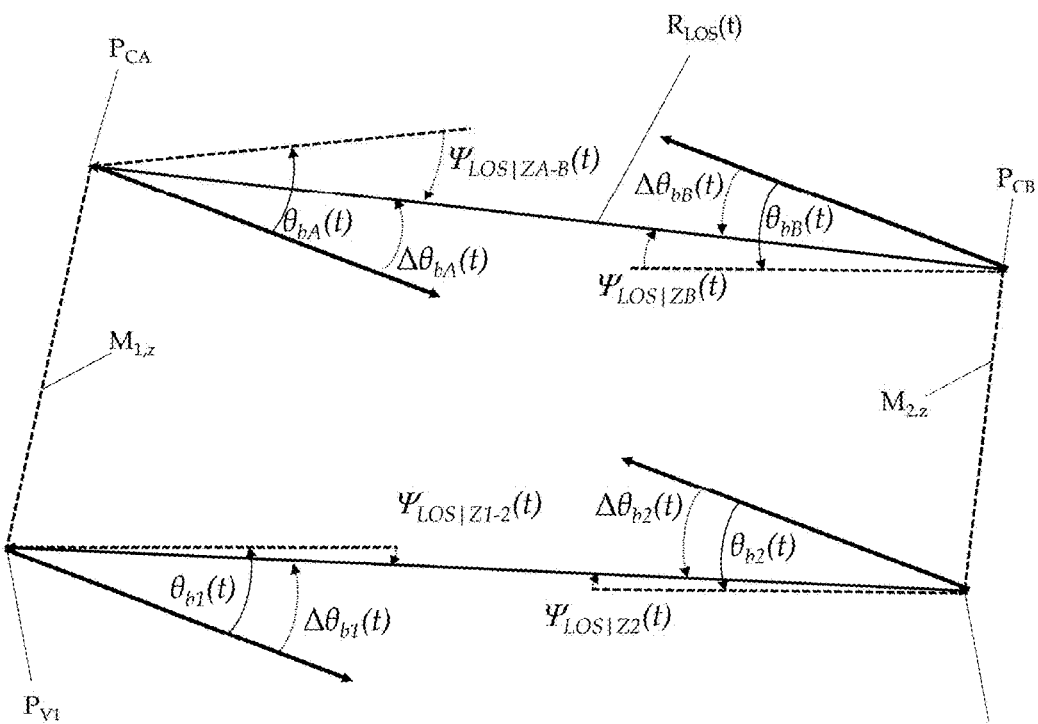

Finally, the variation of the roll angle $\Delta\theta_{r1}$ of the vehicle 1 at the instant t can be approximated by the relationship:

$$\Delta\theta_{r1}(t) = \tan^{-1}\left(\frac{k_1(t) - \bar{k}_1}{0.5\ell_{T1}}\right), \quad (10)$$

where $\bar{k}_1$ indicates the height (with respect to the ground S as shown in FIG. 9C, in the example considered $\bar{k}_1 = \bar{h}_1$) of the point of origin $P_{V1}$ with respect to the horizontal plane S measured along the vertical axis $Z_1$ considered in the reference condition of the vehicle 1 (e.g. an initial position or a position at a previous measurement instant of the vehicle 1) and $k_1(t)$ corresponds to the distance measured between the transverse end portion of the vehicle 1 in the reference condition along the transverse axis $Y_1$ and the horizontal plane S, measured along the vertical axis $Z_1$, modified by a rotation of the vehicle 1 about the longitudinal axis $X_1$—i.e., a roll of the vehicle 1—, detected in the time instant t, and $\ell_{T1}$ indicates the transverse extension (i.e., along the axis $Y_1$) of the vehicle 1.

As is clear to a person skilled in the art, the same results can be obtained in the case of the vehicle 2 mutatis mutandis.

Roll, yaw and pitch can influence the exchange of radio signals between vehicles 1 and 2, as they modify the position and orientation in space of the antennae 41 and $41_B$ of the vehicles 1 and 2.

In each vehicle 1 and 2, the BTD 45 determines angular variations of the yaw, pitch and roll of the vehicle and of the antenna 41 on the basis of data provided by the sensors 33.

In the scenario shown in FIGS. 1 and 5, in which the vehicles 1 and 2 travel on a rectilinear path, the variation of the pitch angle for both vehicles is null—i.e., $\Delta\theta b1 = \Delta\theta b2 = 0$. In this condition the line of sight angle $\Psi_{LOS|Z}(t)$ of the vehicle 1, is provided by the relationship:

$$\Psi_{LOS|Z1-2}(t) = \tan^{-1}\left(\frac{\bar{h}_2 - \bar{h}_1}{Dist(t)}\right). \quad (11)$$

The line of sight angle $\Psi_{LOS|Z1-2}(t)$ of the vehicle 1 is then converted into a corresponding line of sight angle $\Psi_{LOS|ZA-B}(t)$ with respect to the point of origin $P_{CA}$ of the antenna 41. Analogous results can be obtained for the vehicle 2 mutatis mutandis.

When, instead, the vehicles 1 and 2 have pitch angle variations $\Delta\theta b1$ and $\Delta\theta b2$ different from zero, e.g., when they follow a path with uphill and downhill slopes (schematically shown in FIGS. 10A and 10B) and/or because of braking, vibrations and variations of arrangement of the vehicle 1 or 2 the angle of view $\Psi_{LOS,Z1-2}(t)$ is modified as follows:

$$\Psi_{LOS,Z1-2}(t) = \tan^{-1}\left(\frac{h_2(t) - h_1(t)}{Dist(t)}\right) \approx \Psi_{LOS|Z1-2}(t) - \Delta\theta_{b1}(t) - \Delta\theta_{b2}(t), \quad (12)$$

approximated considering that the vibrations due to braking can be neglected as they are in the order of millimetres/centimetres with respect to the distance between the vehicles 1 and 2, which is typically in the order of metres, i.e.:

$$\frac{h_1(t) - \bar{h}_1}{Dist(t)} \ll 1. \quad (13)$$

The line of sight angle $\Psi_{LOS|Z1-2}(t)$ of the vehicle 1 is then converted into a corresponding line of sight angle $\Psi_{LOS|ZA-B}(t)$ with respect to the point of origin $P_{CA}$ of the antenna 41. Analogous results can be obtained for the vehicle 2 mutatis mutandis.

Likewise, the effect of the yaw on the line of sight angle $\Psi_{LOS,X1-2}(t)$ with respect to the longitudinal axis $X_1$, goes from a balanced condition that can be defined by the relationship:

$$\Psi_{LOS|X1-2}(t) = \tan^{-1}\left(\frac{\bar{x}_2 - \bar{x}_1}{Dist(t)}\right), \quad (14)$$

to a dynamic condition defined by the relationship:

$$\Psi_{LOS|X1-2}(t) = \tan^{-1}\left(\frac{x_2(t) - x_1(t)}{Dist(t)}\right) \approx \Psi_{LOS|X1-2}(t) - \Delta\theta_{i1}(t) - \Delta\theta_{i2}(t). \quad (15)$$

The line of sight angle $\Psi_{LOS|X1-2}(t)$ of the vehicle 1 is then converted into a corresponding line of sight angle $\Psi_{LOS|XA-B}(t)$ with respect to the point of origin $P_{CA}$ of the antenna 41.

Therefore, in the vehicle 1, the BTD $45_A$ combines predictions on the position of the antenna 41—represented by means of the angular variations $\Delta\theta_{b,A}(t)$, $\Delta\theta_{i,A}(t)$ and, possibly, $\Delta\theta_{r,A}(t)$—with predictions on the position of the antenna $41_B$—represented by means of angular variations $\Delta\theta_{b,B}(t)$, $\Delta\theta_{i,B}(t)$ and, possibly, $\Delta\theta_{r,B}(t)$—so as to obtain the prediction of the line of sight angles $\Psi_{LOS|ZA-B}(t)$, $\Psi_{LOS|XA-B}(t)$ and, possibly $\Psi_{LOS|YA-B}(t)$, and therefore determine the vector $R_{LOS}(t)$ which comprises the azimuth angles $\varphi_{aA}(t)$ and an angle of elevation $\varphi_{eA}(t)$ of the communication direction.

The control module BF $435_A$ therefore calculates the coefficient b(t) on the basis of the vector $_{LOS,A}(t)$ provided by the BTD $45_A$ for the time frame $TF_n$. Such coefficient will be updated at the end of the subsequent signalling window $T_S$ when the BTD provides a new vector $_{LOS,A}(t)$.

The beamforming module $433_A$ therefore proceeds with the beamforming, checking every microstrip antenna 411 comprised in the antenna 41 so as to transmit radio signals along the line of communication $R_{LOS}(t)$.

At the same time, the communication system $40_B$ of the vehicle 2 performs the same operations described above until obtaining the beamforming of the radio signals emitted by the antenna $41_B$ along the communication direction $R_{LOS,B}(t)$.

The invention thus conceived is susceptible to several modifications and variations, all falling within the scope of the inventive concept.

For example, the method comprising the procedures 600 and 700 can be implemented using different reference systems, such as a polar coordinate system.

Although reference has been made to the presence of only one antenna in the vehicles 1 and 2, nothing prevents a vehicle from being equipped with two or more antennae and implementing the method according to the present invention so as to orient the radio signals emitted by all the antennae or a sub-set thereof.

Furthermore, the method according to the present invention is adapted to control antennae provided with—or mounted on—respective movement units. In this case, the BTD 45 will be configured to activate the movement unit of the antenna on the basis of the processing described above so as to orient the position of the antenna without performing any beamforming. Furthermore, nothing prevents from using the method according to an embodiment of the present invention to control the orientation of an antenna both mechanically and through beamforming.

It will appear clear to a person skilled in the art that the method according to the present invention is applicable to the directional transmission of electromagnetic waves through relevant radiating systems also in different bands of frequency, such as, for example, in the order of Gigahertz GHz and Terahertz THz, in which the radiating systems are represented by antennae 41 and $41_B$ that operate like radiating systems both in reception and transmission mode. In even higher frequencies, the generation of electromagnetic signals is represented by optical communication systems, or optical wireless systems, wherein the radiating systems 41 and $41_B$ comprise one or more generators of optical signals (e.g. laser with modulation, LED systems in the visible light spectrum, etc.) and corresponding one or more optical signal detectors (e.g. one or more photodiodes). In this case, the beam(s) emitted by the light generators is/are deflected using relevant deflection systems for light signals (e.g. mirrors) according to the pointing defined by the BTD 45.

Naturally, nothing prevents from providing alternative embodiments, wherein the communication system 40, or at least the radiating system 41, is coupled to the vehicle 1 in a non-rigid way, and/or alternative embodiments considering variations over time of the centre of gravity of the vehicle and of the respective radiating system due to the load applied to vehicles (e.g. passengers and goods, possibly moveable). In both cases, the distance vector M and the angular vector A vary with time and can be obtained by processing the measurements provided by the sensors 33, by accessing to the information processed by the ECU 31, or by means of other additional sensors, e.g. configured to measure the vibrations of the radiating system 41.

In one embodiment, the prediction procedure 600 can envisage the use of both a gyroscope comprised between the sensors 33 of the on-board electronic system 30 and a gyroscope of the communication system 40. In this case, the data provided are combined with one another to obtain a better signal noise ratio and therefore more reliable angular speeds $\dot{\Omega}_{V1}(t)$ and $\dot{\Omega}_{V2}(t)$, and $\dot{\Omega}_{CA}(t)$ and $\dot{\Omega}_{CB}(t)$.

Furthermore, nothing prevents from implementing alternative embodiments, wherein the BTD 45 is connected to the respective ECU 31 and/or to a further on-board electronic system processing unit 30 and is configured to access information on the vertical and/or transverse speeds already processed by the ECU 31—and/or by a further processing unit of the corresponding on-board electronic system 30—for other purposes, e.g. for the assistance and/or automation of the running of the vehicle.

With regard to the linear speeds, in alternative embodiments, each BTD 45 can be provided for the use of a differential GPS sensor (which therefore comprises at least two receptor elements) of the vehicle for estimating the linear speed of the vehicle. However, as is known, the speed measurements of a differential GPS sensor may not always be available, e.g. in situations such as tunnels, underpasses or underground car parks, therefore the use of such a differential GPS is preferable only in addition to other sensors that allow data to be acquired from which to obtain the linear speeds.

Additionally, the estimate of one or more of the linear speeds $\dot{P}_{V1}(t)$ or $\dot{P}_{V2}$, for example the speed along the lateral axis $Y_1$ or $Y_2$ of the respective vehicle 1 or 2, can be improved by including information related to the vehicle 1 or 2 as described in Donald Selmanaj, Matteo Corno, Giulio Panzani, and Sergio M. Savaresi: "Vehicle Sideslip Estimation: A Kinematic Based Approach" published in Elsevier "Control Engineering Practice", volume 67, pages 1-12, October 2017. In particular, the BTD 45 can only obtain information thanks to communication with the on-board electronic system 30.

Alternatively, or additionally, the BTD 45 can be configured to use in the dynamics prediction of the radiating system 41 also characteristic parameters of the communication system 40, such as characteristic parameters of the radiating system 41, opening of the beam, desired bit rate, transmission power, reception sensitivity, etc., in particular to determine with greater precision the linear speeds of the radiating system 41.

Although the description refers only to two vehicles it is clear that embodiments of the present invention are applicable to other types of vehicles, road vehicles, nautical and aerospace craft. Likewise, the orientation of the radio signals obtained through the method and system described herein can also be implemented in the event of communication between vehicles of different types.

Furthermore, although a communication method and system V2V is described above, it will be clear to a person skilled in the art that the solution according to the present invention can be adapted to different communication systems between vehicles to a target device different from a vehicle, such as fixed antennae or other radiating transceiver systems connected to infrastructures or 'V2I' (e.g. base stations of a communication network) and/or, more generally to any other device provided with suitable radiating transceiver systems (millimetre wave antennae, optical wireless systems, etc.) such as IoT devices, smartphones, tablets, computers or 'V2X'.

Finally, all the details can be replaced by other technically equivalent elements, just as one or more of the steps of the method can be performed in a different order and/or in parallel.

In practice, the materials used, as well as the contingent shapes and sizes, can be whatever according to the requirements without for this reason departing from the scope of protection of the following claims.

The invention claimed is:

1. A method for transmitting electromagnetic signals from a moving vehicle to a target device,
   wherein the moving vehicle comprises a communication system, provided with a radiating system by which it receives and transmits electromagnetic signals, and the method comprises
   performing an alignment step with the target device to establish a first communication direction with the target device,
   communicating with the target device by orienting the radiating system in order to receive and transmit data along said first communication direction, and
   performing a subsequent phase for maintaining the alignment with the target device in which
   determining a position and an orientation of the vehicle, based on data measured by at least one sensor of the vehicle, said sensor being operatively connected to an electronic control unit of the vehicle configured to implement control and/or driving assistance functions of the vehicle based on information received from said sensor,
   receiving dynamics information indicative of or adapted to predict a future position and orientation of a radiating system of the target device,
   and further comprising
   determining a future position and orientation of the radiating system based on the determined position and orientation of the vehicle,
   determining a future position and orientation of the radiating system of the target vehicle based on the determined position and orientation of the target device,
   determining a second communication direction which connects the future position of the radiating system to the future position of the radiating system of the target device, said second communication direction being determined by combining the future position and orientation of the radiating system with the dynamics information and
   orienting the electromagnetic signals emitted by the radiating system of the vehicle on the basis of the determined direction of communication.

2. The method according to claim 1, wherein the radiating system of the vehicle and the radiating system of the target device comprise each an antenna system.

3. The method according to claim 1, wherein the radiating system of the vehicle and the radiating system of the target device each comprises a generator of optical signals and a detector of optical signals.

4. The method according to claim 1, further comprising:
   generating additional information indicative of or adapted to predict a future position and orientation of the radiating system of the vehicle, and
   transmitting said further information to the target device.

5. The method according to claim 1, wherein the information comprises at least one of:
   parameters of a function of a future dynamic of the radiating system of the target device;
   filtering coefficients indicative of the future dynamic of the radiating system of the target device, and
   one or more measures detected by a sensor operatively connected to an electronic control unit of the target device configured to implement control functions and/or drive assistance of the vehicle based on information received from said sensor, and information on a position of said sensor and on a position of the radiating system in the target device.

6. The method according to claim 1, further comprising, in the phase of maintaining the alignment:
   acquiring at least one linear speed measure and at least one angular speed measure of the vehicle, and
   estimating at least one linear velocity measure and at least one angular velocity measure of the radiating system of the vehicle.

7. The method according to claim 6, further comprising, in the phase of maintaining the alignment:
   acquiring one or more of:
      at least one shock absorber elongation measure of the vehicle;
      at least one measure of the steering angle of the vehicle;
      at least one measure of a torque transmitted by a vehicle engine;
      at least one pressure measure applied to a vehicle braking apparatus, and
      at least one measure of a distance between the first vehicle and the target device, and
   combining two or more of these measures to estimate:
      at least one linear speed measurement of the vehicle's radiating system.

8. The method according to claim 1, wherein the step of determining, based on data measured by at least one sensor of the vehicle, a future position and orientation of the radiating system comprises combining the measured data with:
   characteristic parameters of the vehicle, the characteristic parameters comprising at least one among a mass, a center of gravity, a weight of a transported load and geometric characteristics of the vehicle, and
   transmission parameters of electromagnetic signals, the transmission parameters comprising at least one among a time interval, a pointing angle and opening of a beam of electromagnetic signals, and a variability of an electromagnetic transmission channel.

9. The method according to claim 1, wherein the step of determining, based on data measured by at least one sensor of the vehicle, a future position and orientation of the radiating system comprises estimating at least one linear speed of the vehicle's radiating system according to the relationship $$\dot{P}_{CA}(t) = M \wedge \dot{\Omega}_{V1}(t) + \dot{P}_{V1}(t),$$

where M is a vector a vector of spatial values indicative of a difference between relative positions and orientation between a center of mass of the vehicle and a center of mass of the radiating system thereof, $\dot{\Omega}_{V1}(t)$ is a vector of the angular velocities of the vehicle, and $\dot{P}_{V1}(t)$ is a vector of the linear vehicle speeds.

10. The method according to claim 1, wherein the step of maintaining the alignment with the target device is performed during a signaling time window periodically repeated in consecutive communication time periods.

11. A communication system equipped with an adjustable radiating system, the communication system, comprising:
constraining means for connection to a vehicle;
a communication interface connectable to a communication line on which data of at least one sensor of the vehicle is transmitted, said sensor being operatively connected to an electronic control unit of the vehicle configured to implement control and/or driving assistance functions of the vehicle based on information received from said sensor,
an electronic unit operatively connected to said communication interface to receive the data of said at least one sensor and,
wherein the communication system is configured to:
perform an alignment step with the target device to establish a first communication direction with the target device,
communicate with the target device by orienting the radiating system in order to receive and transmit data along said first communication direction, and
perform a subsequent phase for maintaining the alignment with the target device in which
determine a position and an orientation of the vehicle, based on data measured by at least one sensor of the vehicle, said sensor being operatively connected to an electronic control unit of the vehicle configured to implement control and/or driving assistance functions of the vehicle based on information received from said sensor,
receive dynamics information indicative of or adapted to predict a future position and orientation of a radiating system of the target device,
determine a future position and orientation of the radiating system based on the determined position and orientation of the vehicle,
determine a future position and orientation of the radiating system of the target vehicle based on the determined position and orientation of the target device,
determine a second communication direction which connects the future position of the radiating system to the future position of the radiating system of the target device, said second communication direction being determined by combining the future position and orientation of the radiating system with the dynamics information and
orientate the electromagnetic signals emitted by the radiating system of the vehicle on the basis of the determined direction of communication.

12. A vehicle comprising a communication system, the communications system comprising:
constraining means for connection to the vehicle;
a communication interface connectable to a communication line on which data of at least one sensor of the vehicle is transmitted, said sensor being operatively connected to an electronic control unit of the vehicle configured to implement control and/or driving assistance functions of the vehicle based on information received from said sensor,
an electronic unit operatively connected to said communication interface to receive the data of said at least one sensor and,
wherein the communication system is configured to
perform an alignment step with the target device to establish a first communication direction with the target device,
communicate with the target device by orienting the radiating system in order to receive and transmit data along said first communication direction, and
perform a subsequent phase for maintaining the alignment with the target device in which
determine a position and an orientation of the vehicle, based on data measured by at least one sensor of the vehicle, said sensor being operatively connected to an electronic control unit of the vehicle configured to implement control and/or driving assistance functions of the vehicle based on information received from said sensor,
receive dynamics information indicative of or adapted to predict a future position and orientation of a radiating system of the target device,
determine a future position and orientation of the radiating system based on the determined position and orientation of the vehicle,
determine a future position and orientation of the radiating system of the target vehicle based on the determined position and orientation of the target device,
determine a second communication direction which connects the future position of the radiating system to the future position of the radiating system of the target device, said second communication direction being determined by combining the future position and orientation of the radiating system with the dynamics information and orientate the electromagnetic signals emitted by the radiating system of the vehicle on the basis of the determined direction of communication, and
wherein the vehicle comprises an on-board electronic system provided with at least one sensor configured to acquire inertial data associated with a movement of the vehicle, an electronic control unit and a communication channel configured to operatively connect the sensor to the electronic control unit, and
wherein the communication system is operatively connected to at least one of the communication channel and the electronic control unit to acquire at least a part of inertial data detected by the sensor.

* * * * *